United States Patent
Yasuda

(10) Patent No.: US 10,839,980 B2
(45) Date of Patent: Nov. 17, 2020

(54) COVERED ELECTRIC WIRE

(71) Applicant: AGC Inc., Chiyoda-ku (JP)

(72) Inventor: Satoko Yasuda, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/164,045

(22) Filed: Oct. 18, 2018

(65) Prior Publication Data

US 2019/0051429 A1 Feb. 14, 2019

Related U.S. Application Data

(63) Continuation of application No. PCT/JP2017/016800, filed on Apr. 27, 2017.

(30) Foreign Application Priority Data

Apr. 28, 2016 (JP) ................................. 2016-091890

(51) Int. Cl.
| | |
|---|---|
| *H01B 7/02* | (2006.01) |
| *H01B 3/44* | (2006.01) |
| *C08L 27/12* | (2006.01) |
| *H01B 7/18* | (2006.01) |
| *B60R 16/02* | (2006.01) |
| *C08F 214/18* | (2006.01) |

(52) U.S. Cl.
CPC ......... *H01B 3/445* (2013.01); *B60R 16/0215* (2013.01); *C08F 214/18* (2013.01); *C08L 27/12* (2013.01); *H01B 3/44* (2013.01); *H01B 7/02* (2013.01); *H01B 7/18* (2013.01)

(58) Field of Classification Search
CPC . H01B 3/02; H01B 3/445; H01B 3/44; H01B 7/02; H01B 7/04; H01B 7/06; H01B 7/18
USPC .... 174/110 R, 110 E, 120 R, 121 R–120 AR
See application file for complete search history.

(56) References Cited

U.S. PATENT DOCUMENTS

| | | | | |
|---|---|---|---|---|
| 5,051,479 A * | 9/1991 | Logothetis | ............... | C08L 27/12 525/197 |
| 10,294,362 B2 * | 5/2019 | Ueda | ....................... | C08L 27/18 |
| 2003/0018148 A1 * | 1/2003 | Kaspar | ....................... | C08F 2/38 526/209 |
| 2003/0109646 A1 * | 6/2003 | Kubo | ....................... | C08L 59/02 525/420 |
| 2007/0015874 A1 * | 1/2007 | Globus | ................... | C08L 27/12 525/199 |
| 2007/0015875 A1 * | 1/2007 | Globus | ................... | C08J 9/0061 525/199 |
| 2007/0149734 A1 * | 6/2007 | Sakakibara | ............. | C08F 14/18 526/247 |
| 2010/0034919 A1 * | 2/2010 | Brothers | ................. | B32B 27/08 425/461 |
| 2010/0319961 A1 * | 12/2010 | Honda | ................... | H01B 3/305 174/120 SR |
| 2014/0377558 A1 | 12/2014 | Mizuno et al. | | |
| 2015/0203679 A1 * | 7/2015 | Ueda | ....................... | C08L 27/18 428/422 |
| 2015/0357084 A1 * | 12/2015 | Masuda | ................. | H01B 7/292 428/379 |
| 2015/0361265 A1 * | 12/2015 | Isago | ................... | C08K 5/5465 525/102 |
| 2016/0194512 A1 * | 7/2016 | Bandi | ................... | C08F 210/02 428/375 |
| 2017/0301430 A1 * | 10/2017 | Iida | ........................ | C08L 27/12 |

FOREIGN PATENT DOCUMENTS

| | | | | |
|---|---|---|---|---|
| JP | 5-78539 | | 3/1993 | |
| JP | 10-334738 | | 12/1998 | |
| JP | 2004-58583 A | * | 7/2002 | .......... B32B 15/082 |
| JP | 2010-186585 | | 8/2010 | |
| JP | 2014-70206 | | 4/2014 | |
| JP | 2014-070206 A | * | 6/2014 | ............. C08L 81/02 |
| WO | WO 2015/046176 A1 | | 4/2015 | |

OTHER PUBLICATIONS

International Search Report dated Jul. 4, 2017 in PCT/JP2017/016800, filed Apr. 27, 2017.
Y. Matsushita, A. Tanako, *Kobunshi*, 53(9):719-721 (2004) (3 pages).
A. Tanako, S. Suzuki, Y. Matsushita, *Macromolecules*, 36:9288-9291 (2003) (4 pages).

* cited by examiner

*Primary Examiner* — William H. Mayo, III
(74) *Attorney, Agent, or Firm* — Oblon, McClelland, Maier & Neustadt, L.L.P.

(57) ABSTRACT

A covered electric wire has a core wire and a covering material made of a composition applied around the core wire. The covering material is a melt-moldable resin composition. The resin composition may be a fluororesin composition that includes a fluorinated elastomer and a melt-moldable fluororesin. The fluorinated elastomer can be dispersed in the fluororesin. The resin composition has a volume change after being immersed in an automatic transmission fluid at 165° C. for 70 hours of at most 10%, flexural modulus of at most 200 MPa, a rate of the change in tensile elongation after 2,000 hours of a thermal exposure test in the air at 200° C. of at most 30%, and a melting point of at least 215° C.

15 Claims, No Drawings

COVERED ELECTRIC WIRE

TECHNICAL FIELD

The present invention relates to a covered electric wire using a resin composition.

BACKGROUND OF THE INVENTION

A fluorinated elastomer such as a tetrafluoroethylene/propylene copolymer (hereinafter referred to also as a "TFE-P copolymer") is used in an electric wire covering material, etc., as an elastomer material which is excellent in properties such as heat resistance, oil resistance, chemical resistance, electrical insulating properties, flexibility, etc. and which is also radiation-crosslinkable.

Further, in order to supplement the properties of the fluorinated elastomer, it has been in practice to blend the fluorinated elastomer with a fluororesin such as an ethylene/tetrafluoroethylene copolymer (hereinafter referred to also as an "E-TFE copolymer").

For example, in Patent Document 1, a TFE-P copolymer and an E-TFE copolymer are blended in an attempt to improve the mechanical properties such as tensile strength and tear strength, and to improve the properties such as toughness, etc. And, in Patent Document 1, for the purpose of lowering the compound price, in addition to the TFE-P copolymer and the E-TFE copolymer, further, an ethylene-acrylic acid ester copolymer or an ethylene-vinyl acetate copolymer is blended in a large amount.

Further, In Patent Document 2, in order to improve the cut-through property (hardly heat-softenable property at a high temperature) of a TFE-P copolymer, together with the TFE-P copolymer and calcium carbonate, an E-TFE copolymer is blended.

Also in Patent Document 3, in order to improve the cut-through property, a TFE-P copolymer and an E-TFE copolymer are blended. And, in Patent Document 3, it is disclosed that if the E-TFE copolymer to be blended with the TFE-P copolymer is too much, the flexibility and elongation tend to be decreased, and therefore, the blend amount of the E-TFE copolymer to the entire blend polymer, is set to be at most 40 mass %.

Patent Document 1: JP-A-H5-78539
Patent Document 2: JP-A-H10-334738
Patent Document 3: JP-A-2010-186585

BRIEF SUMMARY OF THE INVENTION

Technical Problem

For example, the material to be used for a harness in an automobile engine room, excellent flexibility is required to secure the degree of freedom for wiring of the harness. However, as pointed out in Patent Document 3, in order to secure flexibility by suppressing a decrease in flexibility and elongation, it was necessary to lower the proportion of the E-TFE copolymer to be blended to the TFE-P copolymer. However, if the proportion of the content of the fluororesin to the fluorinated elastomer is lowered, there have been cases where the oil resistance against a lubricating oil such as automatic transmission oil is not sufficient.

Further, if a fluorinated elastomer and a fluororesin are blended, there may be a case where thermal discoloration takes place under heating, whereby the degree of freedom for coloration of a molded body will be narrowed. Further, if the moldability is not sufficient, there has been a case where a defect due to molding failure such as formation of a weld line is likely to result.

The present invention has been made in view of the above circumstances and has an object to provide a covered electric wire using a resin composition which is excellent in flexibility and oil resistance, is less susceptible to thermal discoloration and is excellent in moldability.

Solution to Problem

The present invention has the following embodiments.
[1] A covered electric wire comprising a core wire and a covering material made of a composition applied around the core wire, wherein
the covering material is a melt-moldable resin composition, and
of the resin composition, the volume change after being immersed in an automatic transmission fluid at 165° C. for 70 hours is at most 10%, the flexural modulus is at most 200 MPa, the rate of change in tensile elongation after 2,000 hours of thermal exposure test in air at 200° C. is at most 30%, and the melting point is at least 215° C.
[2] The covered electric wire according to [1], wherein the relative dielectric constant at 1 MHz of the resin composition is at most 10.0.
[3] A white covered electric wire to be used for a semiconductor device, comprising a core wire and a covering material made of a composition applied around the core wire, wherein
the covering material is a melt-moldable resin composition, and
of the resin composition, the flexural modulus is at most 200 MPa, the rate of change in tensile elongation after 2,000 hours of thermal exposure test in air at 200° C. is at most 30%, and the melting point is at least 215° C.
[4] The covered electric wire according to any one of [1] to [3], wherein the resin composition is a fluororesin composition made of a melt-kneaded product comprising a fluorinated elastomer having a storage shear modulus G' of at least 100, and a melt-moldable fluororesin having a melting point of at least 215° C.
[5] The covered electric wire according to [4], wherein the fluorinated elastomer is an elastic copolymer having no melting point.
[6] The covered electric wire according to [4] or [5], wherein the fluorinated elastomer is dispersed in the fluororesin,
the content of the fluorinated elastomer to the total of the fluorinated elastomer and the fluororesin is from 10 to 65 mass %, and the total amount of the fluorinated elastomer and the fluororesin, is at least 90 mass % to the fluororesin composition, and
the storage modulus E' of the fluororesin composition at a temperature higher by 25° C. than the melting point of the fluororesin, is at most 250 kPa.
[7] The covered electric wire according to any one of [4] to [6], wherein the fluororesin composition contains an ethylene copolymer derived from an ethylene copolymer having epoxy groups, wherein the content of the ethylene copolymer is from 0.1 to 10 parts by mass, to 100 parts by mass of the total of the fluorinated elastomer and the fluororesin.
[8] The covered electric wire according to any one of [4] to [7], wherein the fluorinated elastomer is a copolymer having units based on tetrafluoroethylene and units based on propylene.

[9] The covered electric wire according to any one of [4] to [8], wherein the fluorinated elastomer is dispersed in the fluororesin by forming a sea-island structure or a co-continuous structure.

[10] The covered electric wire according to any one of [4] to [9], wherein the fluororesin is a polymer having units based on tetrafluoroethylene, a polymer having units based on vinylidene fluoride, or a polymer having units based on chlorotrifluoroethylene.

[11] The covered electric wire according to [10], wherein the fluororesin is a copolymer having units based on ethylene and units based on tetrafluoroethylene.

[12] The covered electric wire according to any one of [1] to [11], wherein the covering material is a molded product formed by molding a molding material comprising said resin composition.

[13] The covered electric wire according to [12], wherein the molded product is a crosslinked product obtained by crosslinking the molding material, or a crosslinked product obtained by crosslinking a molded product formed by molding the molding material.

[14] A sensor cable using the covered electric wire as defined in any one of [1] to [13].

[15] A power cable using the covered electric wire as defined in any one of [1] to [13].

[16] A wire harness made from the covered electric wire as defined in any one of [1] to [13].

Advantageous Effects of Invention

The covered electric wire of the present invention is excellent in flexibility and oil resistance, is less susceptible to thermal discoloration and has less defect due to molding failure, and thus, is suitable as a covered electric wire for automobiles or machine tools. Further, a white material containing no inorganic component as an additive material is used as the covering material, and thus, it is also suitable as a covered electric wire to be used for a semiconductor device hating particles.

DETAILED DESCRIPTION OF THE INVENTION

[Composition]

The covered electric wire of the present invention is characterized in that it is covered with a covering material made of a composition having specific physical properties.

The composition is a melt-moldable resin composition.

Of the resin composition, the volume change after being immersed in an automatic transmission fluid (ATF) at 165° C. for 96 hours is at most 10%, preferably at most 7%, more preferably at most 5%. As ATF, a known one may be used, and TOYOTAAUTO FLUID D-II, Honda ULTRAATF-DW1, NISSAN MATIC FLUID D, or the like, may be mentioned.

Of the resin composition, the flexural modulus is at most 200 MPa, preferably at most 170 MPa, more preferably at most 150 MPa. Of the resin composition, the rate of change in tensile elongation after 2,000 hours of thermal exposure test in air at 200° C. is at most 30%, preferably at most 25%, more preferably at most 20%. The rate of change in tensile elongation is a value obtained by calculating the rate of change in tensile elongation as between before and after the thermal exposure. Of the resin composition, the melting point is at least 215° C., preferably at least 220° C., more preferably at least 225° C. The melting point is a temperature corresponding to the maximum value at the melting peak as measured by a differential scanning calorimetry (DSC) method.

Further, of the resin composition, the relative dielectric constant at 1 MHz is preferably at most 10.0, more preferably at most 8.0, further preferably at most 5.0.

The above composition has high oil resistance, high flexibility and high heat resistance, and thus, is suitable as a covering material for a covered electric wire to be used in automobiles, machine tools, etc. Further, its relative dielectric constant is low, whereby the transmission characteristics of a high-frequency signal will be improved, and thus, it is suitable also as a sensor cable, etc.

Furthermore, the above composition may be made to be a white material containing no inorganic component as an additive. Such a composition is also suitable as a covering material for a white covered electric wire to be used for a semiconductor device hating particles.

[Fluororesin Composition]

The composition to be used as a covering material for the covered electric wire of the present invention is preferably a fluororesin composition.

The fluororesin composition is made of a melt-kneaded product comprising a specific fluorinated elastomer and a specific fluororesin. The melt-kneaded product is one cooled to room temperature after melt-kneading.

The specific fluorinated elastomer is meant for a "fluorinated elastomer having a storage shear modulus G' of at least 100", which will be hereinafter referred to also as the "component A". The specific fluororesin is meant for a "melt-moldable fluororesin having a melting point of at least 215° C.", which will be hereinafter referred to also as the "component B".

Hereinafter, the above fluororesin composition to be used in the present invention will be referred to also as "the present composition".

The present composition is a melt-kneaded product obtained by melt-kneading raw materials. The raw materials are the above specific fluorinated elastomer and the above specific fluororesin, and it is considered that such raw materials will not be changed during the melt-kneading process, and therefore, the raw materials before the melt-kneading, may also be referred to as the component A and the component B, respectively. Further, with respect to the later-described component C being an optional component, it is considered that its raw material is changed during the melt-kneading process, and therefore the raw material and the component C in the melt-kneaded product are different.

The content of the component A to the total of the components A and B in the present composition is from 10 to 65 mass %, preferably form 10 to 60 mass %, more preferably from 20 to 60 mass %, further preferably from 30 to 55 mass %.

When the component A is contained in the above range, a molded product having excellent flexibility will be obtained. When the component B is contained in the above range, a molded product having excellent oil resistance will be obtained.

The total content of the components A and B in the present composition is at least 90 mass %, preferably from 90 to 100 mass %, more preferably from 95 to 99.7 mass %, further preferably from 97 to 99.5 mass %, to the present composition.

When the above total content is at least the above lower limit value, the effects of the present invention will be sufficiently obtainable, and when it is at most the above upper limit value, it is possible to incorporate another component in order to change the properties of the present composition.

Further, the component A is dispersed in the component B, and the storage modulus E' of the present composition at a temperature higher by 25° C. than the melting point of the component B is at most 250 kPa.

The component A being dispersed in the component B, means that the components A and B are phase-separated. Even if the components A and B are compatibilized to form a uniform molten state in the melt-kneading process, it is believed that the phase separation occurs in the process of cooling. In a case where the components A and B are not compatibilized in the melt-kneading process, it is considered that the component A is dispersed in a fine structure in the component B in the melt-kneading process.

The component A is preferably dispersed in the component B to form a sea-island structure (spherical) or co-continuous structure (gyroid).

In the present invention, the sea-island structure means a structure in a state where discontinuous portions (component A in the present invention) are mixed in a relatively continuously visible portion (component B in the present invention) and means that the maximum width of each mass of discontinuous portions is about 70 µm.

In the present invention, the co-continuous structure means a state where the respective masses of discontinuous portions in the sea-island structure are partially bonded to have a continuous structure where they are continuously connected with the maximum width of at most 50 µm.

The storage modulus E' of the present composition is at most 250 kPa, preferably from 0 to 200 kPa, more preferably from 0 to 150 kPa, further preferably from 0 to 130 kPa.

When the storage modulus E' is within the above range, it is possible to secure sufficient fluidity at the time of molding, thus the moldability will be excellent, and a molded product comprising the present composition will be excellent in surface smoothness.

(Fluorinated Elastomer)

In the present invention, the fluorinated elastomer as the component A shows a storage shear modulus G' of at least 100.

The storage shear modulus G' of the fluorinated elastomer is at least 100, preferably from 150 to 1,000, more preferably from 200 to 800, further preferably from 220 to 600.

When the above storage shear modulus G' is at least the above lower limit value, the mechanical strength of the molded product will be good. When the storage shear modulus G' is at most the above upper limit value, it will have a high fluidity, and its dispersion in the component B will be good, and it will be possible to increase the flexibility of the molded product.

The fluorinated elastomer as the component A may be any elastic copolymer (elastomer) having no melting point, which contains fluorine and shows a storage shear modulus G' of at least 100.

The fluorine content in the fluorinated elastomer is preferably from 50 to 74 mass %, more preferably from 55 to 70 mass %. Such a fluorine content is, specifically, preferably from 57 to 60 mass % in the later-described TFE/P-containing copolymer, preferably from 66 to 71 mass % in the later-described HFP/VdF-containing copolymer, or preferably from 66 to 70 mass % in the later-described TFE/PMVE-containing copolymer.

When the above fluorine content is at least the above lower limit value, a molded product having excellent heat resistance and chemical resistance can be obtained. When the above fluorine content is at most the above upper limit value, it is possible to increase the flexibility of the molded product.

The fluorine content is obtainable by an analysis of the fluorine content and represents the proportion of the mass of fluorine atoms to the total mass of all atoms constituting the fluorinated elastomer.

The number average molecular weight of the fluorinated elastomer is preferably from 10,000 to 1,500,000, more preferably from 20,000 to 1,000,000, further preferably from 20,000 to 800,000, particularly preferably from 50,000 to 600,000. When the number average molecular weight is at least the above lower limit value, the mechanical strength of the molded product will be good. When the number average molecular weight is at most the above upper limit value, it will have a high fluidity, thus its dispersion in the component B will be good, and it will be possible to increase the flexibility of the molded product.

The above number average molecular weight is a value measured by a gel permeation chromatography (hereinafter referred to as "GPC").

As the component A, one type of the fluorinated elastomer may be used alone, or two or more types may be used in combination, but it is preferred to use one type.

The fluorinated elastomer as the component A is preferably an elastomer comprising units based on at least one type of monomer (hereinafter referred to also as "monomer (MA1)") selected from tetrafluoroethylene (TFE), hexafluoropropylene (HFP), vinylidene fluoride (VdF) and chlorotrifluoroethylene (CTFE).

In a case where the fluorinated elastomer is an elastomer comprising units based on the monomer (MA1), the fluorinated elastomer may be an elastomer composed solely of two or three types of units selected from units based on TFE (hereinafter referred to also as "TFE units", the same applies to other units), HFP units, VdF units and CTFE units, or an elastomer composed of at least one type of units based on a monomer (MA1) and another monomer other than the monomer (MA1) (hereinafter referred to also as "monomer (MA2)") which is copolymerizable with the monomer (MA1) and whereby the elastomer becomes to be an elastic copolymer.

The monomer (MA2) may be at least one type of compound selected from the group consisting of ethylene, propylene, a perfluoro(alkyl vinyl ether) (PAVE), vinyl fluoride (VF), 1,2-difluoroethylene (DiFE), 1,1,2-trifluoroethylene (TrFE), 3,3,3-trifluoro-1-propylene (TFP), 1,3,3,3-tetrafluoropropylene and 2,3,3,3-tetrafluoropropylene. A unit based on ethylene in a polymer may be represented by "E", and a unit based on propylene may be represented by "P".

Here, PAVE is a monomer represented by the following formula (I), which may specifically be perfluoro(methyl vinyl ether) (PMVE), perfluoro(ethyl vinyl ether) (PEVE), perfluoro(propyl vinyl ether) (PPVE), perfluoro(butyl vinyl ether) (PBVE), etc.

$$CF_2=CF(ORF) \tag{I}$$

wherein RF is a $C_{1-8}$ linear or branched perfluoroalkyl group.

The fluorinated elastomer may have at least one type of units based on another monomer (hereinafter referred to also as a "monomer (MA3)") other than the monomers (MA1) and (MA2), which is copolymerizable with the monomer (MA1) and whereby the elastomer becomes an elastic copolymer.

In all units constituting the fluorinated elastomer, the units based on the monomer (MA3) are preferably at most 20 mol %, more preferably at most 5 mol %, further preferably none i.e. no units based on the monomer (MA3).

The fluorinated elastomer is preferably such that 100 mol % of all units constituting the fluorinated elastomer consists of two or three types of units based on the monomer (MA1), or consists of at least one type of units based on the monomer (MA1) and at least one type of units based on the monomer (MA2). However, it is permissible to contain monomer units other than these.

The elastomer composed of two or three types of units based on the monomer (MA1), and the elastomer composed of at least one type of units based on the monomer (MA1) and at least one type of units based on the monomer (MA2) will contribute to the flexibility of the molded product.

The fluorinated elastomer as the component A may be a TFE/P-containing copolymer (meaning a copolymer comprising TFE units and P units; here, the total of the respective units connected by "/", i.e. the total of TFE units and P units in the case of the TFE/P-containing copolymer, is preferably at least 50 mol % as the percentage in the total of all units; the same applies to other "containing copolymers"), a HFP/VdF-containing copolymer, or a TFE/PAVE-containing copolymer.

Here, the TFE/PAVE-containing copolymer being a copolymer having TFE units and PAVE units, does not include one which further contains P units or VdF units. Further, the HFP/VdF-containing copolymer being a copolymer having HFP units and VdF units, does not include one which further contains P units.

The TFE/P-containing copolymer includes TFE/P (meaning a copolymer comprising TFE units and P units; the same applies to other), TFE/P/VF, TFE/P/VdF, TFE/P/E, TFE/P/TFP, TFE/P/PAVE, TFE/P/1,3,3,3-tetrafluoropropene, TFE/P/2,3,3,3-tetrafluoropropene, TFE/P/TrFE, TFE/P/DiFE, TFE/P/VdF/TFP and TFE/P/VdF/PAVE, and among them, TFE/P is preferred.

The HFP/VdF-containing copolymer includes HFP/VdF, TFE/VdF/HFP, TFE/VdF/HFP/TFP, TFE/VdF/HFP/PAVE, VdF/HFP/TFP and VdF/HFP/PAVE, and among them, HFP/VdF is preferred.

The TFE/PAVE-containing copolymer includes TFE/PAVE, TFE/PMVE and TFE/PMVE/PPVE, and among them, TFE/PMVE is preferred.

As the fluorinated elastomer, in addition to the above TFE/P-containing copolymer, HFP/VdF-containing copolymer and TFE/PAVE-containing copolymer, TFE/VdF/2,3,3,3-tetrafluoropropene, VdF/PAVE, VdF/2,3,3,3-tetrafluoropropene and E/HFP may be mentioned.

Among the above-mentioned fluorinated elastomers, the TFE/P-containing copolymer, the HFP/VdF-containing copolymer or the TFE/PAVE-containing copolymer is preferred; the TFE/P-containing copolymer is more preferred; and the TFE/P copolymer is further preferred.

The compositions of these elastomers are, with a view to contributing to the flexibility of the molded product obtainable from the present composition, preferably in the following ranges.

In TFE/P, TFE:P (meaning the molar ratio of TFE units to P units; the same applies to the following other molar ratios) is preferably 30-80:70-20, more preferably 40-70:60-30, further preferably 60-50:40-50. In TFE/P/VF, TFE:P:VF=preferably 30-60:60-20:0.05-40. In TFE/P/VdF, TFE:P:VdF=preferably 30-60:60-20:0.05-40. In TFE/P/E, TFE:P:E=preferably 20-60:70-30:0.05-40. In TFE/P/TFP, TFE:P:TFP=preferably 30-60:60-30:0.05-20. In TFE/P/PAVE, TFE:P:PAVE=preferably 40-70:60-29.95:0.05-20. In TFE/P/1,3,3,3-tetrafluoropropene, TFE:P:1,3,3,3-tetrafluoropropene=preferably 30-60:60-20:0.05-40. In TFE/P/2,3,3,3-tetrafluoropropene, TFE:P:2,3,3,3-tetrafluoropropene=preferably 30-60:60-20:0.05-40. In TFE/P/TrFE, TFE:P:TrFE=preferably 30-60:60-20:0.05-40. In TFE/P/DiFE, TFE:P:DiFE=preferably 30-60:60-20:0.05-40. In TFE/P/VdF/TFP, TFE:P:VdF:TFP=preferably 30-60:60-20:0.05-40:0.05-20. In TFE/P/VdF/PAVE, TFE:P:VdF:PAVE=preferably 30-70:60-20:0.05-40:0.05-20. In HFP/VdF, HFP:VdF=preferably 99-5:1-95. In TFE/VdF/HFP, TFE:VdF:HFP=preferably 20-40:1-40:20-40. In TFE/VdF/HFP/TFP, TFE:VdF:HFP:TFP=preferably 30-60:0.05-40:60-20:0.05-20. In TFE/VdF/HFP/PAVE, TFE:VdF:HFP:PAVE=preferably 30-70:60-20:0.05-40:0.05-20. In VdF/HFP/TFP, VdF:HFP:TFP=preferably 1-90:95-5:0.05-20. In VdF/HFP/PAVE, VdF:HFP:PAVE=preferably 20-90:9.95-70:0.05-20. In TFE/PAVE, TFE:PAVE=preferably 40-70:60-30. In TFE/PMVE, TFE:PMVE=preferably 40-70:60-30. In TFE/PMVE/PPVE, TFE:PMVE:PPVE=preferably 40-70:3-57:3-57. In TFE/VdF/2,3,3,3-tetrafluoropropene, TFE:VdF:2,3,3,3-tetrafluoropropene=preferably 1-30:30-90:5-60. In VdF/PAVE, VdF:PAVE=preferably 3-95:97-5. In VdF/2,3,3,3-tetrafluoropropene, VdF:2,3,3,3-tetrafluoropropene=preferably 30-95:70-5. In E/HFP, E:HFP=preferably 40-60:60-40.

(Production of Fluorinated Elastomer)

The fluorinated elastomer can be produced by copolymerizing at least one type of monomer (MA1) and, as the case requires, at least one type of one or both of monomer (MA2) and monomer (MA3).

The polymerization method may be an emulsion polymerization method, a solution polymerization method, a suspension polymerization method, a bulk polymerization method, etc. From the viewpoint of easy adjustment of the number average molecular weight or copolymer composition of the fluorinated copolymer and excellent productivity, an emulsion polymerization method of polymerizing monomers in the presence of an aqueous medium and an emulsifier, is preferred.

In the emulsion polymerization method, a latex of an elastomer is obtained via a step (emulsion polymerization step) of polymerizing (emulsion polymerizing) a monomer component comprising the above monomers in the presence of an aqueous medium, an emulsifier and a radical polymerization initiator. In the emulsion polymerization step, a pH adjusting agent may be added.

(Fluororesin)

In the present composition, the fluororesin as the component B is a melt-moldable resin with a melting point of at least 150° C.

The fluorine content in the fluororesin as the component B is preferably from 50 to 74 mass %, more preferably from 53 to 70 mass %. Further, in another embodiment, the fluorine content is preferably from 50 to 70 mass %, and in further another embodiment, the fluorine content is preferably from 53 to 74 mass %.

When the fluorine content is at least the above lower limit value, a molded product excellent in heat resistance and chemical resistance can be obtained. When the fluorine content is at most the above upper limit value, it is possible to increase the flexibility of the molded product.

The above fluorine content is obtainable by an analysis of the fluorine content and represents the proportion of the mass of fluorine atoms to the total mass of all atoms constituting the fluororesin.

The number average molecular weight of the fluororesin as the component B is preferably from 10,000 to 1,000,000, more preferably from 20,000 to 500,000, further preferably from 20,000 to 300,000, still more preferably from 50,000 to 300,000. When the number average molecular weight is at least the above lower limit value, the mechanical strength of the molded product will be good. When the number average molecular weight is at most the above upper limit value, the fluororesin has high flowability, whereby the fluorinated elastomer can be well dispersed, and it is possible to increase the flexibility of the molded product.

The melting point of the fluororesin as the component B is at least 215° C., preferably from 215 to 300° C., more preferably from 215 to 280° C., further preferably from 215 to 270° C.

When the melting point is at least the above lower limit value, a fluororesin composition having sufficient heat resistance can be obtained. When the melting point is at most the above upper limit value, it is possible to produce a fluororesin composition and a molded product without requiring a high temperature.

As the fluororesin as the component B, one type may be used, or two or more types may be used, but it is preferred to use one type.

The fluororesin is preferably a polymer comprising at least one type of units based on the following monomer (MB1) to monomer (MB7).

Monomer (MB1): TFE, CTFE.

Monomer (MB2): a compound represented by the following formula (II) (hereinafter referred to also as "FAE").

$$CH_2=CX(CF_2)_nY \qquad (II)$$

wherein X and Y may be the same or different and are each a hydrogen atom or a fluorine atom, and n is an integer of from 2 to 8.

Monomer (MB3): a fluoroolefin having hydrogen atoms in an unsaturated group, such as VdF, vinyl fluoride, trifluoroethylene, hexafluoroisobutylene, etc.

Monomer (MB4): a fluoroolefin having no hydrogen atom in an unsaturated group, such as HFP, etc. (but excluding monomer (MB1)).

Monomer (MB5): PAVE.

Monomer (MB6): a perfluorovinyl ether having two unsaturated bonds, such as $CF_2=CFOCF_2CF=CF_2$, $CF_2=CFO(CF_2)_2CF=CF_2$, etc.

Monomer (MB7): a fluorinated monomer having an aliphatic ring structure, such as perfluoro(2,2-dimethyl-1,3-dioxole), 2,2,4-trifluoro-5-trifluoromethoxy-1,3-dioxole, perfluoro(2-methylene-4-methyl-1,3-dioxolane), etc.

From such a viewpoint that the obtainable molded product will be excellent in the heat resistance, chemical resistance, weather resistance and non-tackiness, the fluororesin preferably contains units based on the monomer (MB1), and more preferably contains TFE units among the units based on the monomer (MB1).

Further, from such a viewpoint that the obtainable molded product will be excellent in the heat resistance, chemical resistance, weather resistance and non-tackiness, the fluororesin preferably contains units based on the monomer (MB1) and units based on at least one type of monomer selected from the monomer (MB2) to monomer (MB7), more preferably contains units based on the monomer (MB1) and units based on at least one type of monomer selected from the monomer (MB2), monomer (MB4) and monomer (MB5) and further preferably contains units based on the monomer (MB1), units based on the monomer (MB4) and units based on the monomer (MB5).

Further, in the formula (II), n is an integer of from 2 to 8, and from the viewpoint of polymerization reactivity with other monomers, is preferably an integer of from 2 to 6, more preferably an integer of from 2 to 4. When n in the formula (II) is at least the above lower limit value, it is possible to prevent occurrence of such a problem as cracking in the resin. When n in the formula (II) is at most the above upper limit value, it has a good polymerization reactivity.

FAE may specifically be $CH_2=CF(CF_2)_2F$, $CH_2=CF(CF_2)_3F$, $CH_2=CF(CF_2)_4F$, $CH_2=CF(CF_2)_5F$, $CH_2=CF(CF_2)_8F$, $CH_2=CF(CF_2)_2H$, $CH_2=CF(CF_2)_3H$, $CH_2=CF(CF_2)_4H$, $CH_2=CF(CF_2)_5H$, $CH_2=CF(CF_2)_8H$, $CH_2=CH(CF_2)_2F$, $CH_2=CH(CF_2)_3F$, $CH_2=CH(CF_2)_4F$, $CH_2=CH(CF_2)_5F$, $CH_2=CH(CF_2)_6F$, $CH_2=CH(CF_2)_8F$, $CH_2=CH(CF_2)_2H$, $CH_2=CH(CF_2)_3H$, $CH_2=CH(CF_2)_4H$, $CH_2=CH(CF_2)_5H$, $CH_2=CH(CF_2)_8H$, etc.

In a case where the fluororesin contains at least one type of units based on the monomer (MB1) to monomer (MB7), the fluororesin may contain at least one type of units based on a monomer (hereinafter referred to also as "MB8") other than the monomer (MB1) to monomer (MB7), which is copolymerizable with the monomer (MB1) to monomer (MB7).

The monomer (MB8) may be a monomer having no functional group, or a functional group-containing monomer.

As the monomer having no functional group, for example, the following monomers may be mentioned.

α-Olefins: ethylene, propylene, butene, etc.

Alkyl vinyl ethers: ethyl vinyl ether, propyl vinyl ether, butyl vinyl ether, isobutyl vinyl ether, cyclohexyl vinyl ether, etc.

Vinyl esters: vinyl acetate, vinyl propionate, vinyl n-butyrate, vinyl isobutyrate, vinyl valerate, vinyl pivalate, vinyl caproate, vinyl caplyrate, vinyl caprate, vinyl versalate, vinyl laurate, vinyl myristate, vinyl palmitate, vinyl stearate, vinyl benzoate, vinyl p-t-butylbenzoate, vinyl cyclohexane carboxylate, vinyl monochloroacetate, vinyl adipate, vinyl acrylate, vinyl methacrylate, vinyl crotonate, vinyl sorbate, vinyl cinnamate, vinyl undecylate, vinyl hydroxyacetate, vinyl hydroxypropionate, vinyl hydroxybutyrate, vinyl hydroxyvalerate, vinyl hydroxyisobutyrate, vinyl hydroxycyclohexane carboxylate, etc.

Alkylallyl ethers: ethylallyl ether, propylally ether, butylallyl ether, isobutylallyl ether, cyclohexylallyl ether, etc.

Alkylallyl esters: ethylallyl ester, propylallyl ester, butylallyl ester, isobutylallyl ester, cyclohexylallyl ester, etc.

As the functional group-containing monomer, for example, the following monomers may be mentioned.

Vinyl ethers having a hydroxy group or an epoxy group: glycidyl methacrylate, etc.

Unsaturated carboxylic acids: acrylic acid, methacrylic acid, maleic acid, itaconic acid, citraconic acid, undecylenic acid, etc.

Unsaturated carboxylic acid anhydrides: maleic anhydride, itaconic anhydride, citraconic anhydride, himic anhydride, etc.

The fluororesin as the component B may be a TFE-containing polymer (meaning a polymer having TFE units; the same applies to other "containing polymers"), a VdF-containing polymer, a CTFE-containing polymer, etc.

Here, a polymer having VdF units is regarded as a VdF-containing polymer even if it further has TFE units or CTFE units. Further, a CTFE-containing polymer, even if it is a polymer having CTFE units, does not include one which further contains one or both of TFE units and VdF units.

The TFE-containing polymer may be an E/TFE-containing copolymer, a TFE/HFP-containing copolymer or a TFE/PAVE-containing copolymer.

The CTFE-containing polymer may be an E/CTFE-containing copolymer.

Further, as one type of the TFE/PAVE-containing copolymer, PFA may be mentioned.

Here, the component B is a melt-moldable resin having a melting point of at least 215° C., and the component A is an elastic copolymer having no melting point. Thus, for example, a TFE/PAVE type copolymer as the component B and a TFE/PAVE type copolymer as the component A are different.

Among the above fluororesins, from the viewpoint of excellent balance of heat resistance, chemical resistance and mechanical strength, as the component B, the following ETFE and E/CTFE-containing copolymer are preferred; in a certain embodiment, the following ETFE is more preferred; and in another embodiment, the E/CTFE-containing copolymer is more preferred.

With a view to easily contributing to an excellent balance of heat resistance, chemical resistance and mechanical strength of the present composition, as the E/TFE-containing copolymer, preferred is an E/TFE-containing copolymer (hereinafter referred to also as "ETFE") wherein the molar ratio of E units:TFE units is from 80:20 to 20:80, and units other than the E units and TFE units (hereinafter referred to also as "third units") are contained in an amount of at most 20 moles to all units. In ETFE, the molar ratio of E units:TFE units is more preferably from 70:30 to 30:70, further preferably from 50:50 to 35:65.

The content of the third units in ETFE is preferably from 0.01 to 20 mol %, more preferably from 0.1 to 10 mol %, further preferably from 0.8 to 5 mol %, to all units.

As the third units, preferred are units based on FAE.

The melting point of ETFE is preferably from 150 to 300° C., more preferably from 160 to 280° C., further preferably from 170 to 270° C.

Further, the volume flow rate of ETFE is preferably from 0.1 to 200 mm$^3$/sec, more preferably from 0.5 to 100 mm$^3$/sec, further preferably from 1 to 50 mm$^3$/sec.

The volume flow rate is an index showing the melt fluidity of the resin and becomes a measure of the molecular weight. The larger the volume flow rate, the lower the molecular weight, and the smaller the volume flow rate, the higher the molecular weight.

The volume flow rate is obtainable by using a Shimadzu Flowtester, as an extrusion rate of the resin at the time of extruding it in an orifice with a diameter of 2.1 mm and a length of 8 mm under a load of 7 kg at a temperature higher by 50° C. than the melting point of the resin.

(Other Components)

The present composition may contain, in addition to the components A and B, other components as optional components, but not including components having an action such as to denature the components A and B at the time of melt-kneading (for example, a cross-linking agent, cross-linking aid, etc. which will be described later).

Other components may be an ethylene copolymer derived from an ethylene copolymer containing epoxy groups (hereinafter referred to also as "component C") and a flame retardant, and the present composition may contain one or both of them.

The total of such other components to occupy in the present composition is at most 10 mass %, preferably at most 8 mass %, more preferably at most 5 mass %, of the present composition.

The present composition may contain, in addition to the components A and B, the ethylene copolymer as the component C. The component C is capable of increasing the compatibility of the components A and B, and making dispersion of the component A in the component B better.

The component C is a component contained in the fluororesin composition being a melt-kneaded product and derived from an ethylene copolymer containing epoxy groups prior to melt-kneading. At the time of melt-kneading the ethylene copolymer containing epoxy groups together with said fluorinated elastomer and said fluororesin to form a melt-kneaded product, some or all of the epoxy groups are considered to be lost by the reaction. Disappearance of the epoxy groups at the time of melt-kneading is considered to be contributing to such an action that the component C increases the compatibility of the components A and B and thus to improve the dispersibility of the component A.

The content of the component C in the melt-kneaded product is equal to the content of the ethylene copolymer containing epoxy groups in all raw material components before melt-kneading (comprising the component A, the component B, the ethylene copolymer containing epoxy groups and, optionally, a flame retardant). Because, even if the epoxy groups disappear, the mass change between the proportion of the ethylene copolymer containing epoxy groups in the raw material and the component C in the present composition is negligible.

In a case where the present composition contains the component C, the content of the component C is from 0.1 to 10 parts by mass, preferably from 0.3 to 8 parts by mass, more preferably from 0.5 to 5 parts by mass, to 100 parts by mass of the total of the components A and B.

When the content of the component C is at least the above lower limit value, thermal discoloration of the present composition or its molded product is less likely to occur, and when it is at most the above upper limit value, a molded product having sufficient oil resistance and heat resistance can be obtained.

<Ethylene Copolymer Containing Epoxy Groups>

The ethylene copolymer containing epoxy groups has a melting point, whereby it can be melt-kneaded together with said fluorinated elastomer and said fluororesin. That is, its melting point is less than 150° C.

As the ethylene copolymer containing epoxy groups, one type may be used alone, or two or more types may be used in combination, but it is preferred to use one type.

The ethylene copolymer containing epoxy groups may be an ethylene copolymer such as a binary or higher multi-component copolymer comprising E units and units based on at least one type of a monomer having an epoxy group (hereinafter referred to also as a "monomer (MC1)"), or a ternary or higher multi-component copolymer comprising E units, units based on at least one type of the monomer (MC1) and units based on at least one type of a monomer other than ethylene and the monomer (MC1) (hereinafter referred to also as a "monomer (MC2)") which is copolymerizable with ethylene.

The monomer (MC1) may be an unsaturated glycidyl ether (allyl glycidyl ether, 2-methyl allyl glycidyl ether, vinyl glycidyl ether, etc.), an unsaturated glycidyl ester (glycidyl acrylate, glycidyl methacrylate, etc.), etc. From such a viewpoint that it is possible to improve the compatibility between the components A and B, glycidyl methacrylate is preferred as the monomer (MC1).

The monomer (MC2) may be an acrylic ester (methyl acrylate, ethyl acrylate, etc.), a methacrylic acid ester (methyl methacrylate, ethyl methacrylate, etc.), a fatty acid vinyl ester (vinyl acetate, etc.), an α-olefin other than ethylene, etc.

From such a viewpoint that it is possible to improve the compatibility between the components A and B, as the monomer (MC2), an acrylic acid ester, a methacrylic acid ester and a fatty acid vinyl ester (hereinafter collectively referred to also as a "monomer (MC3)", i.e. the monomer (MC3) is a collection of some of monomers (MC2)).

As the ethylene copolymer containing epoxy groups, from such a viewpoint that the moldability of the present composition and the properties such as the flexibility, oil resistance, etc. of the molded product will be better, preferred is an E/glycidyl methacrylate-containing copolymer having E units and glycidyl methacrylate units, and more preferred is an E/glycidyl methacrylate copolymer or an E/glycidyl methacrylate/monomer (MC3) copolymer.

As the E/glycidyl methacrylate/monomer (MC3) copolymer, an E/glycidyl methacrylate/vinyl acetate copolymer, an E/glycidyl methacrylate/methyl acrylate copolymer, or an E/glycidyl methacrylate/ethyl acrylate copolymer may be mentioned, and an E/glycidyl methacrylate/methyl acrylate copolymer, or an E/glycidyl methacrylate/ethyl acrylate copolymer is preferred.

The content of E units occupying in the ethylene copolymer containing epoxy groups is preferably from 55 to 99.9 mol %, more preferably from 70 to 94 mol %, from the viewpoint of heat resistance and toughness of the molded product.

The content of units based on the monomer (MC1) occupying in the ethylene copolymer containing epoxy groups is preferably from 0.1 to 45 mol %, more preferably from 1 to 10 mol %, from the viewpoint of the moldability of the present composition and the mechanical properties of the molded product.

In a case where the ethylene copolymer containing epoxy groups has units based on the monomer (MC2), the content of units based on the monomer (MC2) occupying in the ethylene copolymer containing epoxy groups, is preferably from 1 to 30 mol %, more preferably from 5 to 20 mol %.

By using the ethylene copolymer containing epoxy groups wherein the contents of the respective units are within the above ranges, it is possible to improve the compatibility between the components A and B. As a result, the moldability of the present composition will be excellent, and the resulting molded product will be more excellent in such properties as flexibility, oil resistance, heat resistance, etc.

As the ethylene copolymer containing epoxy groups, commercially available products may also be used, and as commercially available products of the ethylene copolymer containing epoxy groups, "BONDFAST E (Sumitomo Chemical Co., Ltd. trade name)" (E/glycidyl methacrylate copolymer), and "BONDFAST 7M" (Sumitomo Chemical Co., Ltd. trade name, E/glycidyl methacrylate/methyl acrylate copolymer) may be mentioned.

<Flame Retardant>

The flame retardant is not particularly limited, and a known flame retardant may be employed. For example, it may be aluminum hydroxide, magnesium hydroxide, magnesium carbonate, antimony trioxide, sodium antimonate, antimony pentoxide, a phosphazene compound, a phosphate ester, ammonium polyphosphate, melamine polyphosphate•melam•melem, red phosphorus, a molybdenum compound, a boric acid compound, PTFE, etc. Among them, antimony trioxide, an aromatic phosphoric acid ester (triphenyl phosphate, tricresyl phosphate, trixylenyl phosphate, cresyl phenyl phosphate, 2-ethylhexyl diphenyl phosphate, etc.), or PTFE (being an anti-drip agent to form a fibril structure in the resin) is preferred.

(Method for Producing Fluororesin Composition)

The fluororesin composition of the present invention is produced by melt-kneading the components A and B, and, as the case requires, the above-mentioned optional components, followed by cooling. The cooled melt-kneaded product is preferably a solid kneaded product to be used as a molding material, formed into pellets or granules having a suitable size. The melt-kneading method is preferably a method for melt-kneading extrusion by an instrument having a melt-kneading extrusion mechanism. A linear melt-kneaded product melt-kneaded and extruded, may be cut in a suitable size to obtain a pelletized or granular melt-kneaded product.

Here, optional components may be melt-kneaded together with the components A and B at the time of melt-kneading extrusion of the components A and B.

As mentioned above, the component C as an optional component is a component derived from an ethylene copolymer having epoxy groups as a raw material. The ethylene copolymer having epoxy groups becomes to be the component C by melt-kneading, but in the change (loss of epoxy groups), it is considered that there is no quantitative change in the material, and therefore, the amount of the ethylene copolymer having epoxy groups in the raw material before melt-kneading is from 0 to 10 parts by mass to 100 parts by mass of the total of said specific fluorinated elastomer and said specific fluororesin.

As the apparatus to be used for melt-kneading extrusion, it is preferred to use an instrument having a twin or higher multi-screw melt kneading extrusion mechanism, such as a twin-screw extruder or a multi-screw extruder, and it is more preferred to use a twin screw extruder equipped with high kneading effect screws, or a multi-screw extruder equipped with high kneading effect screws.

As the high kneading effect screws, it is possible to select ones which provide sufficient kneading effects to the object to be melt-kneaded and extruded and which do not give an excessive shearing force.

The instrument having a twin or higher multi screw melt kneading extrusion mechanism is preferably an instrument having a continuous twin or higher multi screw melt kneading extrusion mechanism.

By using an instrument having a continuous twin or higher multi screw melt kneading extrusion mechanism, it is possible to provide sufficient kneading effects to the object to be melt-kneaded and extruded. If an instrument having a batch-type melt kneading extrusion mechanism is used, the shearing force tends to be insufficient, and thus there may be a case where no sufficient kneading effects can be given to the object to be melt-kneaded and extruded.

Further, the instrument having a twin or higher multi screw melt kneading extrusion mechanism is provided with at least one kneading zone, and is preferably provided with at least two kneading zones.

Further, the ratio (L/D) of the length L of the kneading zone (if comprising two or more kneading zones, the total of lengths of the respective kneading zones) to the screw diameter D in the instrument having a twin or higher multi screw melt kneading extrusion mechanism is preferably from 0.1 to 50, more preferably from 1 to 20, further preferably from 3 to 10.

The melt kneading extrusion is conducted preferably at a temperature higher by at least 5° C., more preferably at a temperature higher by from 5 to 80° C., further preferably at a temperature higher by from 5 to 50° C., than the melting point of the component B.

The shear rate in the melt kneading extrusion is preferably set depending on the melt viscosity of the object to be melt kneaded and extruded.

The screw rotational speed of the instrument having a twin or higher multi screw melt kneading extrusion mechanism in the melt kneading extrusion is preferably from 50 to 700 rpm, more preferably from 100 to 500 rpm, further preferably from 200 to 400 rpm.

In the melt kneading extrusion, by suitably adjusting the number of kneading zones, the lengths of kneading zones, the kneading temperature and the shear rate, it is possible to control the storage modulus E' of the present composition at a temperature higher by 25° C. than the melting point of the component B to be at most 250 kPa.

By providing more kneading zones, in the melt kneading extrusion, it is possible to make the component A dispersed in the component B to have a smaller particle size and to be in a better dispersed state.

Further, by making the length of the kneading zone (if comprising two or more kneading zones, the total of lengths of the respective kneading zones) longer, in the melt kneading extrusion, it is possible to make the component A dispersed in the component B to have a smaller particle size and to be in a better dispersed state.

Further, by making the kneading temperature higher, in the kneading extrusion, it is possible to make the component A dispersed in the component B to have a smaller particle size and to be in a better dispersed state.

Further, by making the shear rate larger, in the extrusion kneading, it is possible to make the component A dispersed in the component B to have a smaller particle size and to be in a better dispersed state.

By suitably adjusting these conditions to bring, in the melt kneading extrusion, the component A dispersed in the component B to have a sufficiently small particle size and to be in a sufficiently dispersed state, it is possible to control the storage modulus E' of the present composition at a temperature higher by 25° C. than the melting point of the component B, to be at most 250 kPa.

The melt kneading extrusion is carried out until the viscosity of the object to be melt kneaded and extruded becomes constant. The change in viscosity during the melt kneading extrusion of the object to be melt kneaded and extruded can be observed by the change with time of the rotational torque by a torque meter via a screw.

Here, "until the viscosity of the object to be melt kneaded and extruded becomes constant" means that the melt kneading extrusion is carried out until the change in the value of the rotational torque becomes to be in a state being within 5% from the center value over a certain time.

The time required for the melt kneading extrusion may vary depending on e.g. the kneading temperature, the shear rate, the composition of the object to be melt kneaded and extruded, the shape of screws of the instrument having a twin or higher multi screw melt kneading extrusion mechanism, etc., but from the viewpoint of economy and productivity, it is preferably from 1 to 30 minutes, more preferably from 1 to 20 minutes, further preferably from 2 to 10 minutes.

As the form of the component A to be used in the melt kneading extrusion, crumb is preferred. In particular, it is preferred to use crumb of a fluorinated elastomer obtained by aggregating a latex of an elastomer obtained by emulsion polymerization, by drying it.

As the form of the component B to be used in the melt kneading extrusion, powder is preferred. As the powder, more preferred is one having a small particle size. When the particle size is small, kneading in melt kneading extrusion will be easy, and it will be easy to obtain a homogeneous melt kneading extrusion state. In particular, as the powder, preferred is a powder of a fluororesin obtained by drying a resin slurry obtained by a solution polymerization.

Further, before carrying out the melt kneading extrusion, the crumb of component A and a powder of component B may be mixed without heating by using a known apparatus. Further, the crumb of component A and a powder of component B may be mixed in the apparatus having a twin or higher multi screw melt kneading extrusion mechanism at the time of melt kneading extrusion.

[Molded Product]

A covering material to be used for a covered electric wire of the present invention is such that a molded product obtained by molding the above-mentioned composition is used as the covering material.

The molded product is preferably a molded product (hereinafter referred to also as "the present molded product") obtained by molding a molding material (hereinafter referred to also as "the present molding material") containing the above fluororesin composition. Hereinafter, a description will be made with respect to one wherein the above fluororesin composition is used as a covering material. The present molded product may be a crosslinked product obtained by crosslinking the present molding material, or may be a crosslinked product obtained by crosslinking a molded product obtained by molding the present molding material.

The present molding material may have, in addition to the above fluororesin composition, depending upon the application of the molded product, blending agents added, such as a crosslinking agent, a crosslinking aid, a filler, a stabilizer, a colorant, an antioxidant, a processing aid, a glidant, a lubricant, an antistatic agent, etc., and as the case requires, at least one of them may be added.

At the time of crosslinking the present molding material, it preferably contains a crosslinking agent or a crosslinking aid, among such blending agents.

As the crosslinking agent, any conventional one may be used, but an organic peroxide is preferred. As the organic peroxide, one which easily generates radicals under heating in the presence of a redox, may be used. A fluororesin composition crosslinked by using an organic peroxide will be excellent in heat resistance.

Specific examples of the organic peroxide may be 1,1-di (t-hexyl peroxy)-3,5,5-trimethylcyclohexane, 2,5-dimethyl-hexane-2,5-dihydro peroxide, di-t-butyl peroxide, t-butyl cumyl peroxide, dicumyl peroxide, $\alpha,\alpha'$-bis(t-butylperoxy)-p-diisopropylbenzene, 2,5-dimethyl-2,5-di(t-butylperoxy)-hexane, 2,5-dimethyl-2,5-di(t-butylperoxy)-hexine-3, dibenzoyl peroxide, t-butyl peroxy benzene, 2,5-dimethyl-2,5-di(benzoyl peroxy) hexane, t-butylperoxy maleic acid, t-hexyl peroxy isopropyl monocarbonate, etc. Among them, $\alpha,\alpha'$-bis(t-butylperoxy)-p-diisopropylbenzene may be mentioned. These organic peroxides are excellent in crosslinking properties of the fluorinated elastomer composition.

In the case of producing a crosslinked molded product, the content of the crosslinking agent in the present molding material, is preferably from 0.1 to 5 parts by mass, more preferably from 0.2 to 4 parts by mass, further preferably from 0.5 to 3 parts by mass, to 100 parts by mass of the component A. When the content is within the above range, the crosslinking efficiency of the organic peroxide will be high. As the crosslinking agent, one or more types may be used.

The crosslinking aid may be triallyl cyanurate, triallyl isocyanurate, triacrylformal, triallyl trimellitate, dipropargyl terephthalate, diallyl phthalate, tetraallyl terephthalamide, triallyl phosphate, etc. Among them, triallyl isocyanurate is preferred.

In the case of producing a crosslinked molded product, the content of the crosslinking aid in the present molding material, is preferably from 0.1 to 30 parts by mass, more preferably from 0.5 to 15 parts by mass, further preferably from 1 to 10 parts by mass, to 100 parts by mass of the component A. When the content is at least the above lower limit value, the crosslinking rate tends to be large, and a sufficient degree of crosslinking can be easily obtainable. When the content is at most the above upper limit value, the property such as elongation of the crosslinked product becomes good. As the crosslinking aid, one or more types may be used.

The filler may be carbon black, white carbon, clay, talc, calcium carbonate, glass fiber, carbon fiber, a fluororesin (polytetrafluoroethylene, ETFE, etc.), etc.

The carbon black may be used without limitation so long as it is one used as a filler for a fluorocarbon rubber. Specific examples thereof include furnace black, acetylene black, thermal black, channel black, graphite, etc., and furnace black is preferred. The furnace black may be HAF-LS carbon, HAF carbon, HAF-HS carbon, FEF carbon, GPF carbon, APF carbon, SRF-LM carbon, SRF-HM carbon, MT carbon, etc., and MT carbon is more preferred among these.

In a case where the present molding material contains carbon black, the content of carbon black is preferably from 1 to 50 parts by mass, more preferably from 3 to 20 parts by mass, to 100 parts by mass of the component A. When the content is at least the above lower limit value, the strength of the molded product will be excellent, and an reinforcing effect due to blending of carbon black will be sufficiently obtained. Further, when the content is at most the above upper limit value, elongation of the molded product will be excellent. Thus, when the content of carbon black is within the above range, the balance between the strength and elongation of the molded product will be good.

In a case where the present molding material contains a filler other than carbon black, the content thereof is preferably from 5 to 200 parts by mass, more preferably from 10 to 100 parts by mass, to 100 parts by mass of the present composition.

Here, as the filler, one or more types may be used, and carbon black and another filler may be used in combination. In a case where the present molding material contains carbon black and another filler, the content thereof is preferably from 1 to 100 parts by mass, more preferably from 3 to 50 parts by mass, to 100 parts by mass of the present composition.

The stabilizer may be copper iodide, lead oxide, calcium oxide, magnesium oxide, aluminum oxide, titanium oxide, antimony oxide, phosphorus pentoxide, etc. The content of the stabilizer in the present molding material is preferably from 0.1 to 10 parts by mass, more preferably from 0.2 to 5 parts by mass, further preferably from 0.5 to 3 parts by mass, to 100 parts by mass of the present composition. As the stabilizer, one or more types may be used.

The processing aid may be a higher fatty acid, an alkali metal salt of a higher fatty acid, etc., and specifically, stearic acid, a stearate or a laurate is preferred. The content of the processing aid in the present molding material is preferably from 0.1 to 10 parts by mass, more preferably from 0.2 to 5 parts by mass, further preferably from 1 to 3 parts by mass, to 100 parts by mass of the present composition. As the processing aid, one or more types may be used.

The lubricant may be a higher fatty acid, an alkali metal salt of a higher fatty acid, etc., and specifically, stearic acid, a stearate or a laurate is preferred. The content of the lubricant is preferably from 0.1 to 20 parts by mass, more preferably from 0.2 to 10 parts by mass, further preferably from 1 to 5 parts by mass, to 100 parts by mass of the present composition.

The method for melt molding for the production of the present molded product, may be injection molding, extrusion molding, coextrusion molding, blow molding, compression molding, inflation molding, transfer molding, calendar molding, etc.

The fluororesin composition of the present invention is excellent in moldability, since the melt viscosity is lower than that of the component A, and it is possible to set a take-off speed to be large.

The crosslinking method for producing the present molded product made of the crosslinked product, is not particularly restricted and may be a chemical crosslinking method using an organic peroxide as a crosslinking agent, a radiation crosslinking method using ionizing radiation such as X-rays, γ-rays, electron beam, proton beam, deuteron beam, α rays, p rays, etc., and the crosslinking may be carried out at the same time as the molding, or the crosslinking may be conducted after the molding.

[Covered Electric Wire]

In the covered electric wire of the present invention, the covering material formed around the core wire is not limited to one formed in direct contact with the core wire, but may be one formed indirectly around the core wire via another layer in between. Specifically, the covered electric wire of the present invention is not limited to a conductor being a conductor having the above-mentioned molded product as a covering material, or an insulated electric wire having a core wire covered directly, but includes an electric wire having the above molded product as a covering material as the outer layer, for example, a cable having a sheath or a wire harness. As the cable, a sensor cable, a power cable, etc. may be mentioned. The molded product may, for example, be one in a film shape.

The conductor is not particularly limited and may be copper, a copper alloy, aluminum and an aluminum alloy, various plating wires, such as tin plating, silver plating, nickel plating, etc., a strand, a superconductor, a semiconductor device lead plating wire, etc.

The covered electric wire having a conductor covered by using the above molded product as a covering material, can be produced by covering the conductor by the above fluororesin composition, followed by molding. Covering of the conductor by the fluororesin composition may be carried out by a known method.

The covered electric wire having a conductor covered by using the above molded product as a covering material, produced by covering the conductor by the above fluororesin composition, followed by molding, may further be irradiated with an electron beam to crosslink the molded product of the present invention, to obtain a covered electric wire having the conductor covered by the molded product of the present invention being the crosslinked product as the covering material.

The irradiation dose of the electron beam during the crosslinking is preferably from 50 to 700 kGy, more preferably from 80 kGy to 400 kGy, further preferably from 100 to 250 kGy. The temperature during the electron beam irradiation is preferably from 0 to 300° C., more preferably from 10 to 200° C., further preferably from 20 to 100° C.

The present composition is excellent in moldability, whereby it is possible to produce a covered electric wire of the present invention at a high speed. Further, since it contains the component A, as compared with a covered electric wire using only the thermoplastic component B as the covering material, continuous use at a high temperature is possible, and, since it is excellent in flexibility, it is suitable for use as a covered electric wire for automobiles, an electric wire for machine tools, etc., which require space saving wiring.

Advantageous Effects

The present inventors have found that when the present composition is molded, it is possible to obtain a good molded product excellent in surface smoothness, not only in static molding such as press molding, but also in dynamic molding such as extrusion molding. In contrast, with the conventional fluororesin composition, it has been found that while a molded product having good properties is obtainable in static molding such as press forming, in dynamic molding such as extrusion molding, such properties cannot be maintained, and there may be a case where defective molding occurs so that the surface smoothness tends to be insufficient.

To clarify the cause for forming this difference, with respect to the respective fluororesin compositions, evaluation of their properties were carried out, whereupon it has been found that there is a difference in the storage modulus E' in the fluororesin compositions.

The storage modulus E' of a fluororesin composition is considered to be an index for dispersibility of the fluorinated elastomer in the fluororesin composition.

That is, in a case where a fluorinated elastomer is not sufficiently dispersed in a fluororesin, even when the temperature becomes at least the melting point of the fluororesin, no sufficient fluidity can be obtained due to the influence of the continuous phase of the fluorinated elastomer, and the storage modulus E' of the fluororesin composition increases.

In contrast, in a case where the fluorinated elastomer is sufficiently small-sized and dispersed in the fluororesin, when the fluororesin is melted at a temperature of at least the melting point of the fluororesin, the fluidity of the entire fluororesin composition becomes high, and the storage modulus E' of the fluororesin composition becomes small.

The following is considered to be a cause for occurring a trouble in the dynamic molding when the storage modulus E' of the fluororesin composition is large. That is, even if the fluororesin composition having a large storage modulus E' looks as if the fluorinated elastomer is sufficiently dispersed in the fluororesin, at first glance, the particle size of the fluorinated elastomer is considered to be large as compared with the particle size of the fluorinated elastomer in the present composition. Therefore, it is considered that by the fluorinated elastomer having a low compatibility with the fluororesin tends to mutually agglomerate during the dynamic molding, whereby the dispersion state cannot be maintained. That is, in a case where the fluorinated elastomer is not sufficiently small-sized and dispersed, it is considered that the dispersion of the fluorinated elastomer is a non-equilibrium state, and particularly, in the dynamic molding, the phase separation due to spinodal decomposition will progress.

Therefore, with the conventional fluororesin composition, it is considered that while a molded product having good properties is obtainable in static molding such as press forming, in dynamic molding such as extrusion molding, the fluorinated elastomer which has been dispersed, tends to be aggregated by phase separation due to spinodal decomposition, and even with the fluororesin composition exhibiting excellent physical properties in a state before molding, its physical properties tend to be changed by dynamic molding, and good physical properties prior to molding cannot be maintained.

In contrast, with the present composition, it is considered that since the fluorinated elastomer in the fluororesin composition is sufficiently small-sized and dispersed, the storage modulus E' of the fluororesin composition becomes to be small at a level of at most 250 kPa. Further, since the fluorinated elastomer in the fluororesin composition is sufficiently small-sized and dispersed, the progress of the phase separation due to spinodal decomposition is suppressed, and even at the time when the molding material containing the fluororesin composition is subjected to dynamic molding, a good molded product excellent in surface smoothness is obtainable.

EXAMPLES

Now, the present invention will be specifically described with reference to Examples, but the present invention is not limited to these Examples. The materials used in Examples will be shown below.

<Fluorinated Elastomer>

A1: a fluorinated elastomer (TFE/P copolymer (TFE:P (molar ratio)=56:44, fluorine content: 57 mass %, Mooney viscosity ($ML_{1+10}$ (121° C.)): 120, glass transition temperature (Tg): −3° C.), storage shear modulus G': 530), produced by the following production method.

Inside of a 3.2 L reactor equipped with a stirring anchor blade, was degassed, and 1,500 g of ion exchanged water, 59 g of disodium hydrogen phosphate dodecahydrate, 0.7 g of sodium hydroxide, 197 g of tert-butanol, 9 g of sodium lauryl sulfate and 6 g of ammonium persulfate were added. Further, an aqueous solution prepared by dissolving 0.4 g of disodium ethylenediaminetetraacetate dihydrate and 0.3 g of ferrous sulfate heptahydrate in 100 g of ion exchanged water, was added to the reactor. The pH of the aqueous medium in the reactor at that time was 9.5.

Then, a monomer mixed gas of TFE/P=88/12 (molar ratio) was injected at 25° C. so that the internal pressure of the reactor would be 2.50 MPaG. The anchor blade was rotated at 300 rpm, and then, a 2.5 mass % aqueous solution of sodium hydroxy methane sulfinate dihydrate having the pH adjusted to 10.0 with sodium hydroxide (hereinafter referred to also as "Rongalite 2.5 mass % aqueous solution") was added to the reactor to initiate the polymerization reaction. Thereafter, the Rongalite 2.5 mass % aqueous solution was continuously added to the reactor by using a high pressure pump. At the time when the total amount of the injected monomer mixed gas of TFE/P became 1,000 g, the addition of the Rongalite 2.5 mass % aqueous solution was terminated, and the internal temperature of the reactor was cooled to 10° C., to terminate the polymerization reaction and to obtain a latex of fluorinated elastomer A1. The addition amount of the Rongalite 2.5 mass % aqueous solution was 68 g. The polymerization time was 6 hours. A 5 mass % aqueous solution of calcium chloride was added to the above latex to coagulate the latex of fluorinated elastomer A1 to let the fluorinated elastomer A1 be precipitated. The fluorinated elastomer A1 was filtered and recovered.

<Fluorinated Elastomer>

A2: "DAI-EL G-901" (HFP/VdF-containing copolymer (HFP:VdF:TFE (molar ratio)=30:50:20), fluorine content: 70.5 mass %, Mooney viscosity ($ML_{1+10}$ (100° C.)): 95, storage shear modulus G': 299), manufactured by DAIKIN INDUSTRIES, LTD.

<Fluororesin>

B1: a fluororesin (ethylene/TFE/(perfluorobutyl) ethylene copolymer (molar ratio of ethylene:TFE:(perfluorobutyl) ethylene=40:57:3, MFR: 25 g/10 min, Tg: 75° C., melting point (Tm): 225° C.)), produced in the same manner as in Ex. 9 in WO2016/006644.

B2: a fluororesin (ethylene/TFE/(perfluorobutyl) ethylene copolymer (molar ratio of ethylene:TFE:(perfluorobutyl) ethylene=45.3:53.3:1.4, MFR: 11.7, melting point (Tm): 260° C., produced in the same manner as in Ex. 9 in WO2016/006644.

B3: FEP "NP-20" manufactured by DAIKIN INDUSTRIES, LTD., melting point 270° C.

<Ethylene Copolymer Containing Epoxy Groups>

C1: "BONDFAST (Sumitomo Chemical Co., Ltd., trade name) 7M" (ethylene/glycidyl methacrylate/methyl acrylate copolymer).

The respective measurement items were measured by the following methods.

<Measurement of Storage Shear Modulus G'>

In accordance with ASTM D6204, by using Rubber Process Analyzer (RPA2000, manufactured by Alpha Technologies Ltd.), the torque was measured, in a sample amount of 7.5 g, at a temperature of 100° C. and in a displacement of 0.5°, by changing the frequency from 1 to 2,000 cpm, whereupon from the measured values, the storage shear modulus G' at 50 cpm was calculated.

<Measurement of Storage Modulus E' and Loss Modulus E">

From a sheet with a length of 130 mm, a width of 130 mm and a thickness of 1 mm, prepared by preheating at 255° C. for 5 minutes and press-molding for 5 minutes, a test specimen was cut out, followed by measurements by using DMA (EXSTAR6000, manufactured by Seiko Instruments, Inc.). The storage modulus and the loss modulus are values measured at 250° C. in an air atmosphere, and a test specimen with a length of 45 mm, a width of 8 mm and a thickness of 1 mm was measured in a tensile mode under conditions of gripping width=20 mm, temperature-raising condition=from 25° C. to 300° C., temperature raising rate=3° C./min and frequency=10 Hz. The storage modulus E' and the loss modulus E" are the storage modulus and the loss modulus at a temperature higher by 25° C. than the melting point of the fluororesin, and the storage modulus E' represents the elastic component, and the loss modulus E" represents the viscous component.

<Evaluation of the State of the Surface of a Molded Product>

An extruder (M530-25, manufactured by IKG Corporation), a screw (full flight, L/D=24, cp: 30 mm, manufactured by IKG Corporation), an electric wire die crosshead (maximum conductor diameter: 3 mm, maximum die hole diameter: 20 mm, manufactured by UNITEK), an electric wire take-off machine (manufactured by Hijiri Manufacturing Co., Ltd.) and a winder (manufactured by Hijiri Manufacturing Co., Ltd.) were used. Under conditions of kneading temperature=270° C., screw rotation speed=35 rpm and take-off speed=10 m/min, from a fluororesin composition and a core wire (tinned copper kneading wire, diameter: 1.8 mm, constitution: 37/0.26 mm (1st layer: right twisted 7, 2nd layer: left twisted 12, 3rd layer: right twisted 18), manufactured by YASDA PRECISION TOOLS K.K.), an electric wire sample with a covering thickness of 0.5 mm and a wire diameter φ of 2.8 mm was obtained. The surface roughness of the obtained electric wire sample was visually confirmed. One excellent in surface smoothness with no surface roughness was evaluated as "A", and one poor in surface roughness with surface roughness observed, was evaluated as "B".

<Measurement of Flexural Modulus>

By conducting a test in accordance with ASTM D790, the flexural modulus of each sample was measured.

<Volume Change after Immersion in Automatic Transmission Fluid (ATF)>

By conducting a test in accordance with JIS K7114, each sample was immersed for 96 hours in TOYOTA AUTO FLUID D-II (manufactured by Toyota Motor Corporation) at 165° C., whereupon the volume change as between before and after the immersion was determined. Here, a rate of change being at most 10% was evaluated as ◯, a rate of change exceeding 10% was evaluated as x, and a case where the sample was melted and could not maintain its shape, was evaluated as "unacceptable".

<Heat Exposure Test at 200° C.>

In an electric furnace at 200° C. in air, each sample was put and left to stand, and upon expiration of 2,000 hours, it was returned to room temperature and left to stand overnight. The tensile elongation of each sample was measured by a test in accordance with ASTM D638, and the rate of change in tensile elongation as between before and after heat exposure was calculated. A rate of change being within 30% was evaluated as ◯, a rate of change exceeding 30% was evaluated as x, and a case where the sample was melted and could not maintain its shape was evaluated as "unacceptable".

<Measurement of Melting Point>

The melting point of each sample was measured by using a differential scanning calorimeter (DSC).

<Measurement of Relative Dielectric Constant>

With respect to each sample, a test was conducted in accordance with ASTM D150, and the relative dielectric constant at 23° C. at 1 MHz was measured.

<Evaluation of Color Tone>

For the color tone, each sample was visually observed, and the color tone was evaluated.

Example 1

By means of a twin-screw extruder (KZW32TW-45MG-NH, manufactured by TECHNOVEL CORPORATION, continuous type), 50 parts by mass of A1, 50 parts by mass of B1 and 1 part by mass of C1 were subjected to melt extrusion kneading, to obtain a fluororesin composition 1. The melt extrusion kneading was conducted by adjusting the screw rotation speed to be 250 rpm, under conditions of 240° C. for 2 minutes. Further, in the twin-screw extruder, kneading zones were provided at two locations, and the ratio (L/D) of the total L of lengths of the kneading zones at two locations to the screw diameter D was set to be 6.

The melting point of the fluororesin composition 1 was 225° C., and the storage modulus E' and the loss modulus E" were at most the detection limit (at most 100 kPa).

Evaluation of the state of the surface of the molded product of the obtained fluororesin composition 1 was conducted, whereby the electric wire sample obtained had no surface roughness and was excellent in surface smoothness.

Further, the fluororesin composition 1 was preheated at 250° C. for 5 minutes and molded by pressing for 5 minutes under a condition of 10 MPa, and from the obtained sheet having a length of 130 mm, a width of 130 mm and a thickness of 1 mm, evaluation samples for the respective tests were cut out. With respect to the evaluation samples, the flexural modulus, the volume change after immersion in ATF, the thermal exposure test at 200° C., the melting point measurement, the relative dielectric constant measurement and the color tone evaluation were conducted. The results are shown in Table 1.

Example 2

The evaluation samples of the fluororesin composition 1 in Example 1 were subjected to electron beam crosslinking with an irradiation dose of 120 kGy. The crosslinked samples were composed of a crosslinked product (fluororesin composition 2) of the fluororesin composition 1. With respect to the fluororesin composition 2, evaluations were conducted in the same manner as in Example 1. The results are shown in Table 1.

Examples 3 and 4

A fluororesin composition 3 was obtained in the same manner as in Example 1 except that in Example 1, A1 was changed to A2 and B1 was changed to B2, respectively, and the preheating temperature was changed to 300° C.

A fluororesin composition 4 was obtained in the same manner as in Example 1 except that in Example 1, A1 was changed to A2 and B1 was changed to B3, respectively, and the preheating temperature was changed to 300° C.

With respect to the fluororesin composition 3 and the fluororesin composition 4, evaluations were conducted in the same manner as in Example 1. The results are shown in Table 1.

Comparative Examples 1 to 4

As Comparative Examples 1 to 4, by using the following resins instead of the fluororesin composition 1 of Example 1, evaluation samples were prepared under the following conditions, and the same evaluations as in Example 1 were conducted. The results are shown in Table 1.

Fluororesin 1: "Fluon (trade name) ETFE AR-8018S" manufactured by AGC Chemicals Americas, Inc.

Fluororesin 2: "Fluon ETFE LM-730AP" manufactured by Asahi Glass Company, Limited.

Fluororesin 3: "Dyneon (trade name) THV500G Z" manufactured by 3M.

Fluororesin 4: "Teflon (trade name) FEP 100-J" manufactured by Du Pont-Mitsui Fluorochemicals Co., Ltd.

Fluororesin 5: "KF #1200" manufactured by KUREHA CORPORATION.

With respect to the fluororesin 4, except that the preheating temperature of 250° C. was changed to 300° C., and with respect to the fluororesin 3, except that the preheating temperature of 250° C. was changed to 200° C., in the same manner as in Example 1, a sheet was prepared and evaluation samples were obtained.

With respect to the fluororesin 2, in the same manner as in Example 1, a sheet was prepared and evaluation samples were obtained.

Comparative Example 5

A fluororesin composition 5 was obtained in the same manner as in Example 1, except that in Example 1, A1 was changed to A2 and B1 was changed to the fluororesin 5, and the preheating temperature was changed to 200° C. With respect to the fluororesin composition 5, the same evaluations as in Example 1 were conducted. The results are shown in Table 1.

TABLE 1

|  | Example 1 | Example 2 | Example 3 | Example 4 |
|---|---|---|---|---|
| Compositions, etc. | Fluororesin composition 1 | Fluororesin composition 2 | Fluororesin composition 3 | Fluororesin composition 4 |
| Electron beam irradiation | Nil | 120 kGy | Nil | Nil |
| Flexural modulus | 140 | 150 | 160 | 140 |
| Volume change after immersion in ATF | ◯ | ◯ | ◯ | ◯ |
| Thermal exposure test at 200° C. | ◯ | ◯ | ◯ | ◯ |
| Melting point | 225 | — | 250 | 260 |
| Relative dielectric constant | 2.7 | 2.8 | 6.4 | 6.0 |
| Color tone | White | White | White | White |

|  | Comparative Example 1 | Comparative Example 2 | Comparative Example 3 | Comparative Example 4 | Comparative Example 5 |
|---|---|---|---|---|---|
| Compositions, etc. | Fluororesin 1 | Fluororesin 2 | Fluororesin 3 | Fluororesin 4 | Fluororesin composition 5 |
| Electron beam irradiation | Nil | Nil | Nil | Nil | Nil |
| Flexural modulus | 370 | 720 | 210 | 610 | 180 |
| Volume change after immersion in ATF | ◯ | ◯ | Unacceptable | ◯ | ◯ |
| Thermal exposure test at 200° C. | ◯ | X | Unacceptable | X | X |
| Melting point | 250 | 225 | 165 | 260 | 175 |
| Relative dielectric constant | 2.6 | 2.4 | 3.9 | 2.0 | N.D. |
| Color tone | Brown | Colorless | Colorless | Colorless | White |

From Table 1, it is evident that the composition of the present invention to be used as a covering material for a covered electric wire is excellent in flexibility and oil resistance and at the same time has high heat resistance, whereby it is suitable as a covering material for a covered electric wire for automobiles or machine tools. Further, since its color tone is white, it is also suitable as a covering material for a white covered electric wire to be used for a semiconductor device.

This application is a continuation of PCT Application No. PCT/JP2017/016800, filed on Apr. 27, 2017, which is based upon and claims the benefit of priority from Japanese Patent Application No. 2016-091890 filed on Apr. 28, 2016. The contents of those applications are incorporated herein by reference in their entireties.

What is claimed is:

1. A covered electric wire comprising a core wire and a covering material made of a composition applied around the core wire,
    wherein
    the covering material is a melt-moldable resin composition,
    the melt-moldable resin composition has a volume change after being immersed in an automatic transmission fluid at 165° C. for 70 hours of at most 10%, a flexural modulus of at most 200 MPa, a rate of change in tensile elongation after 2,000 hours of thermal exposure test in air at 200° C. of at most 30%, and a melting point of at least 215° C.,
    the melt-moldable resin composition is a fluororesin composition comprising a melt-kneaded product comprising a fluorinated elastomer having a storage shear modulus G of at least 100, and a melt-moldable fluororesin having a melting point of at least 215° C.,
    the fluorinated elastomer is dispersed in the fluororesin by forming a sea-island structure or a co-continuous structure,
    a content of the fluorinated elastomer to a total of the fluorinated elastomer and the melt-moldable fluororesin is from 10 to 65 mass %, and
    a total content of the fluorinated elastomer and the melt-moldable fluororesin is at least 90 mass % in the fluororesin composition.

2. The covered electric wire according to claim 1, wherein a relative dielectric constant at 1 MHz of the melt-moldable resin composition is at most 10.0.

3. The covered electric wire according to claim 1, wherein the fluorinated elastomer is an elastic copolymer having no melting point.

4. The covered electric wire according to claim 1, wherein a storage modulus E' of the fluororesin composition at a temperature higher by 25° C. than the melting point of the fluororesin, is at most 250 kPa.

5. The covered electric wire according to claim 1, wherein the fluororesin composition comprises an ethylene copolymer derived from an ethylene copolymer having epoxy groups, wherein a content of the ethylene copolymer is from 0.1 to 10 parts by mass, relative to 100 parts by mass of the total of the fluorinated elastomer and the fluororesin.

6. The covered electric wire according to claim 1, wherein the fluorinated elastomer is a copolymer comprising units based on tetrafluoroethylene and units based on propylene.

7. The covered electric wire according to claim 1, wherein the fluororesin is a polymer comprising units based on tetrafluoroethylene, a polymer comprising units based on vinylidene fluoride, or a polymer comprising units based on chlorotrifluoroethylene.

8. The covered electric wire according to claim 7, wherein the fluororesin is a copolymer comprising units based on ethylene and units based on tetrafluoroethylene.

9. The covered electric wire according to claim 1, wherein the covering material is a molded product formed by molding a molding material comprising the melt-moldable resin composition.

10. The covered electric wire according to claim 9, wherein the molded product is a crosslinked product obtained by crosslinking the molding material, or a crosslinked product obtained by crosslinking a molded product formed by molding the molding material.

11. A sensor cable comprising the covered electric wire of claim 1.

12. A power cable comprising the covered electric wire of claim 1.

13. A wire harness made from the covered electric wire of claim 1.

14. A white covered electric wire for a semiconductor device, comprising a core wire and a covering material made of a composition applied around the core wire,
    wherein
    the covering material is a melt-moldable resin composition, and
    the melt-moldable resin composition has a flexural modulus of at most 200 MPa, a rate of change in tensile elongation after 2,000 hours of a thermal exposure test in the air at 200° C. of at most 30%, and a melting point is at least 215° C.

15. The covered electric wire according to claim 14, wherein the melt-moldable resin composition is a fluororesin composition comprising a melt-kneaded product comprising a fluorinated elastomer having a storage shear modulus G' of at least 100, and a melt-moldable fluororesin having a melting point of at least 215° C.

* * * * *